United States Patent
Wynne et al.

(10) Patent No.: US 6,687,781 B2
(45) Date of Patent: Feb. 3, 2004

(54) FAIR WEIGHTED QUEUING BANDWIDTH ALLOCATION SYSTEM FOR NETWORK SWITCH PORT

(75) Inventors: John M. Wynne, Sunnyvale, CA (US); Robert J. Divivier, San Jose, CA (US)

(73) Assignee: Zettacom, Inc., Santa Clara, CA (US)

( * ) Notice: Subject to any disclaimer, the term of this patent is extended or adjusted under 35 U.S.C. 154(b) by 490 days.

(21) Appl. No.: 09/847,078

(22) Filed: May 1, 2001

(65) Prior Publication Data

US 2002/0174279 A1 Nov. 21, 2002

(51) Int. Cl.$^7$ .................. G06F 13/00; G06F 15/173; G01R 31/08
(52) U.S. Cl. .................. 710/317; 710/316; 709/241; 370/229; 370/232
(58) Field of Search .................. 710/29, 60, 316, 710/317; 709/231, 238, 240, 241; 370/229–233, 351–357

(56) References Cited

U.S. PATENT DOCUMENTS

| | | | |
|---|---|---|---|
| 6,408,005 B1 * | 6/2002 | Fan et al. | 370/412 |
| 6,430,155 B1 * | 8/2002 | Davie et al. | 370/232 |
| 6,546,017 B1 * | 4/2003 | Khaunte | 370/412 |

\* cited by examiner

*Primary Examiner*—Tim Vo
(74) *Attorney, Agent, or Firm*—Daniel J. Bedell; Smith-Hill and Bedell (57) ABSTRACT

A traffic manager for a network switch port stores incoming cells in a cell memory and later forwards them out of the cell memory and the switch port. Each cell is assigned to one of several flow queues and each flow queue has an assigned minimum forwarding bandwidth with which cells of that flow queue must be forwarded from the cell memory and has an assigned maximum bandwidth with which cells of that flow queue may be forwarded. When any flow queue is active (i.e., when it has cells currently stored in the cell memory), the traffic manager allocates a sufficient amount of the switch port's available cell forwarding bandwidth to each active flow queue so that cells of that flow queue are forwarded with at least the flow queue's assigned minimum bandwidth. Each flow queue also has an assigned forwarding weight, and the traffic manager also dynamically allocates a portion of the switch port's excess forwarding bandwidth, above that needed to accommodate each active flow queue's minimum bandwidth, among all active flow queues in relative proportion to each active flow queue's assigned forwarding weight. Thus the actual forwarding bandwidth allocated to each active flow queue is the sum of its assigned minimum forwarding bandwidth and its allocated portion of excess bandwidth. However the traffic manager limits the actual forwarding bandwidth allocated to any one flow queue so that it does not exceed the flow queue's assigned maximum forwarding bandwidth.

18 Claims, 7 Drawing Sheets

FAIR WEIGHTED QUEUING BANDWIDTH ALLOCATION SYSTEM FOR NETWORK SWITCH PORT

BACKGROUND OF THE INVENTION

1. Field of the Invention

The present invention relates in general to network switches and in particular to a network switch employing a weighting system for distributing excess forwarding bandwidth among several traffic flows buffered by a network switch port.

2. Description of Related Art

A network switch routes data transmissions such as ethernet packets between a set of network buses. A typical network switch includes a set of input switch ports for receiving packets arriving on the buses, a set of output switch ports for forwarding packets outward on the buses, and a switch fabric such as a crosspoint switch for routing packets from each input switch port to the output switch ports that are to forward them. Network input and output switch ports typically include buffer memories for storing packets until they can be forwarded.

Some network switch input switch ports include protocol processors for converting each incoming packet to a sequence of cells of uniform size. The input port stores the cells in its buffer memory until it can forward them through the switch fabric to one of the output ports. Each output switch port in turn stores cells received via the switch fabric in its buffer memory and later forwards them to another protocol processor which reassembles them into a packet to be forwarded outward on a network bus.

Each input or output switch port has a maximum bandwidth or rate (in cells or packets per second) at which it may forward cells or packets. Some network systems classify packet or cells according to a set of "flows", each having a defined class of service with respect to the portion of a switch port's bandwidth that may be allocated to forwarding the packets assigned to a particular flow. A switch port may allocate each flow (or group of flows) a predetermined guaranteed minimum portion of the port's available forwarding bandwidth. A switch port may also allocate each flow a share of the port's excess bandwidth up to a predetermined maximum limit for each flow.

A switch port therefore must reserve a sufficient amount of its bandwidth to cover the sum of minimum bandwidths of all flows regardless of whether they are active. A flow is "active" if cells or packets assigned to that flow await forwarding from the switch port's buffer memory. The port dynamically allocates its remaining "excess bandwidth" to the active flows. Typically when a flow becomes active, the switch port allocates it any unused portion of the switch port's excess bandwidth up to the flow's maximum allowable bandwidth. Conversely, when a flow becomes inactive, the port terminates the flow's allocation of excess bandwidth so that it can allocate that portion of excess bandwidth to the next flow to become active.

Such a bandwidth allocation system has two problems. First, when a flow is inactive, its reserved minimum bandwidth remains unused and therefore wasted. Second, a port's excess bandwidth is not fairly distributed among active flows but is instead allocated based only on the amount of the port's bandwidth that happens to be unused when a flow becomes active.

What is needed is a bandwidth allocation system for a network switch port which allocates forwarding bandwidth only to active flows and not to inactive flows, and which more fairly allocates the port's excess bandwidth among active flows.

BRIEF SUMMARY OF THE INVENTION

In accordance with one aspect of the invention, a traffic manager for a network switch port stores incoming cells in a cell memory and later forwards them out of the cell memory and the switch port. Each cell is assigned to one of several flow queues and each flow queue has an assigned minimum forwarding bandwidth with which cells of that flow queue must be forwarded from the cell memory and has an assigned maximum bandwidth with which cells of that flow queue may be forwarded.

In accordance with another aspect of the invention, when any flow queue is active (i.e., when it has cells currently stored in the cell memory), the traffic manager allocates a sufficient amount of the switch port's available cell forwarding bandwidth to each active flow queue so that cells of that flow queue are forwarded with at least the flow queue's assigned minimum bandwidth.

In accordance with a further aspect of the invention, each flow queue has an assigned forwarding weight. The traffic manager also dynamically allocates a portion of the switch port's excess forwarding bandwidth, above that needed to accommodate each active flow queue's minimum bandwidth, among all active flow queues in relative proportion to each active flow queue's assigned forwarding weight. Thus the actual forwarding bandwidth allocated to each active flow queue is the sum of its assigned minimum forwarding bandwidth and its allocated portion of excess bandwidth. However the traffic manager limits the actual forwarding bandwidth allocated to any one flow queue so that it does not exceed the flow queue's assigned maximum forwarding bandwidth.

It is accordingly an object of the invention to dynamically allocate the cell forwarding bandwidth of the switch port among active flow queues in a manner that makes efficient use of the switch port's cell forwarding bandwidth.

It is another object of the invention to dynamically allocate to each active flow queue a forwarding bandwidth within a range defined by its assigned minimum and maximum forwarding bandwidths.

It is further object of the invention to ensure that cell forwarding bandwidth is at all times fairly allocated among active flow queues in accordance with a predetermined weighting system.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

DETAILED DESCRIPTION OF THE INVENTION

Network Switch

Figure 1:
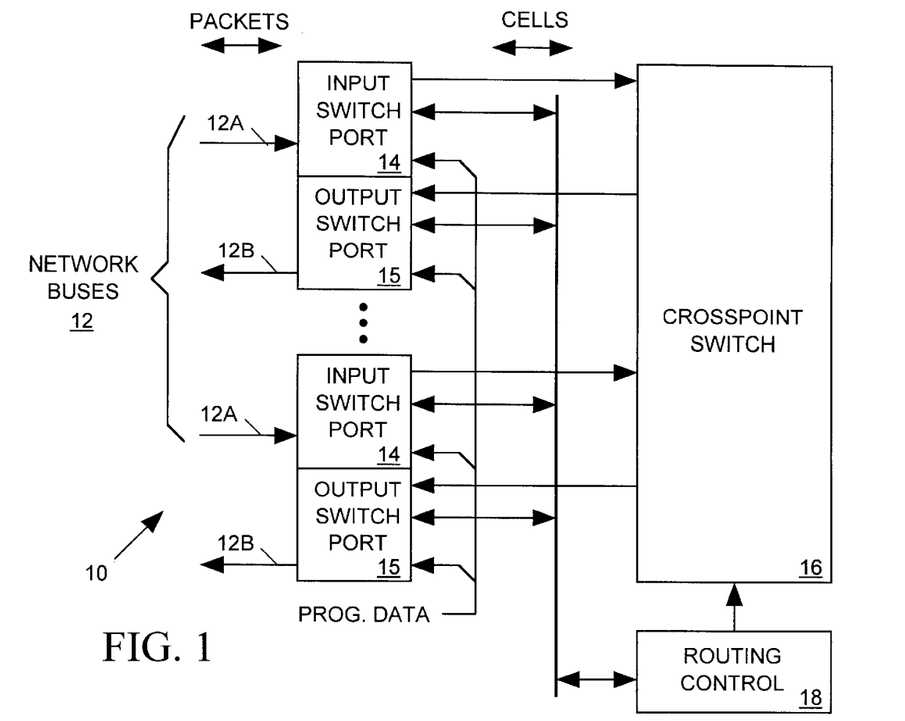
FIG. 1 illustrates a network switch 10 in accordance with the invention for routing network packets between network buses.

FIG. 1 illustrates a network switch 10 in accordance with the invention for routing network transmissions (packets) between a set of network buses 12. Network switch 10 includes input switch ports 14, output switch ports 15, a crosspoint switch 16, and a routing control circuit 18. Each input switch port 14 receives incoming packets arriving on a separate input bus 12A and each output port 15 forwards outgoing packets on a separate output bus 12B. Although not shown in FIG. 1, each input switch port 14 may receive packets on more than one incoming bus 12A and each output port may forward outgoing packets on more than one outgoing bus 12B. Crosspoint switch 16 selectively provides signal paths between input switch ports 14 and output ports 15 in response to control data from routing control circuit 18 based on routing requests from input switch ports 14.

Incoming packets arriving on buses 12A are network data transmissions that may be of any of a variety of formats such as, for example, variable length Ethernet packets. Each input switch port 14 converts each incoming packet to a sequence of one or more "cells" of uniform size and format, and stores each cell in an internal buffer memory. Based on network addressing information included in a packet arriving on one of buses 12A, the input switch port 14 that received the packet determines which output switch port 15 must forward the packet outward on one of outgoing buses 12B toward its intended destination. The receiving input switch port 14 then requests routing control circuit 18 to establish a signal path through crosspoint switch 16 to the appropriate output switch port 15. When routing control circuit 18 grants the request, the receiving input switch port 14 sequentially forwards all of the cells of the packet to the forwarding output switch port 15 via crosspoint switch 16. That output input switch port 15 stores the cells in its own cell memory as they arrive. After receiving all of the cells derived from the incoming packet, the output switch port 15 reassembles the packet from those cells and forwards the packet outward on one of outgoing network buses 12B.

Switch Ports

Figure 2A:
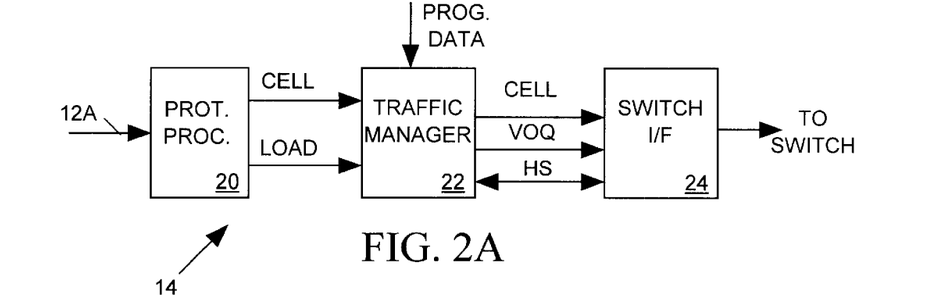
FIG. 2A illustrates one input switch port of FIG. 1 in more detailed block diagram form.

FIG. 2A illustrates one input switch port 14 of FIG. 1 in more detailed block diagram form. Switch port 14 includes a protocol processor 20 for converting incoming packets on bus 12A into cell sequences. As protocol processor 20 produces each cell, it pulses a LOAD signal input to a traffic manager 22 to indicate when a CELL is available. Traffic manager 22 temporarily stores the cells derived from each received packet in an internal cell memory and determines from data included in the packet which output switch port 15 is to forward the packet outward from network switch 10. Thereafter traffic manager sequentially forwards the cells of the packet to a switch interface circuit 24 using handshaking signals HS to coordinate transfer of the cell. Traffic manager 22 also sends a code (VOQ) to switch interface 24 with each cell, the VOQ code identifying the output switch port 15 that is to receive the cells. Switch interface circuit 24 stores each incoming cell and then requests routing control circuit 18 for a signal path to the forwarding output switch port 15 through crosspoint switch 16 of FIG. 1, and thereafter forwards the cell to the forwarding output switch port 15 via the requested signal path.

Figure 2B:
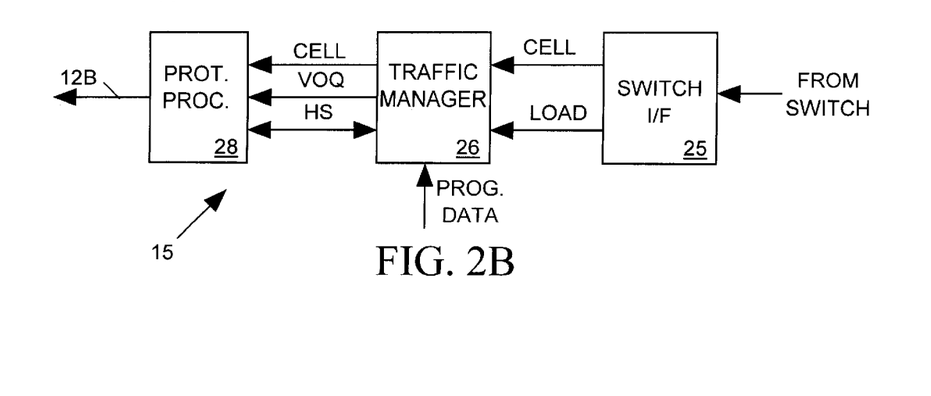
FIG. 2B illustrates one output switch port of FIG. 1 in more detailed block diagram form.

FIG. 2B illustrates one output switch port 15 of FIG. 1 in more detailed block diagram form. When its switch interface 25 receives cells from crosspoint switch 16 it forwards them to a traffic manager 26, pulsing a LOAD signal input to indicate when each cell is available. Traffic manager 26 stores cells in an internal cell memory as they arrive, and after receiving the last cell of a sequence derived from an incoming packet, traffic manager 26 forwards the cell sequence to a protocol processor 28 using handshaking signals HS to coordinate the transfer. Protocol processor 28 then reassembles the packet from the cell sequence and forwards it outward on the outgoing network bus 12B.

Traffic Manager

Figure 3:
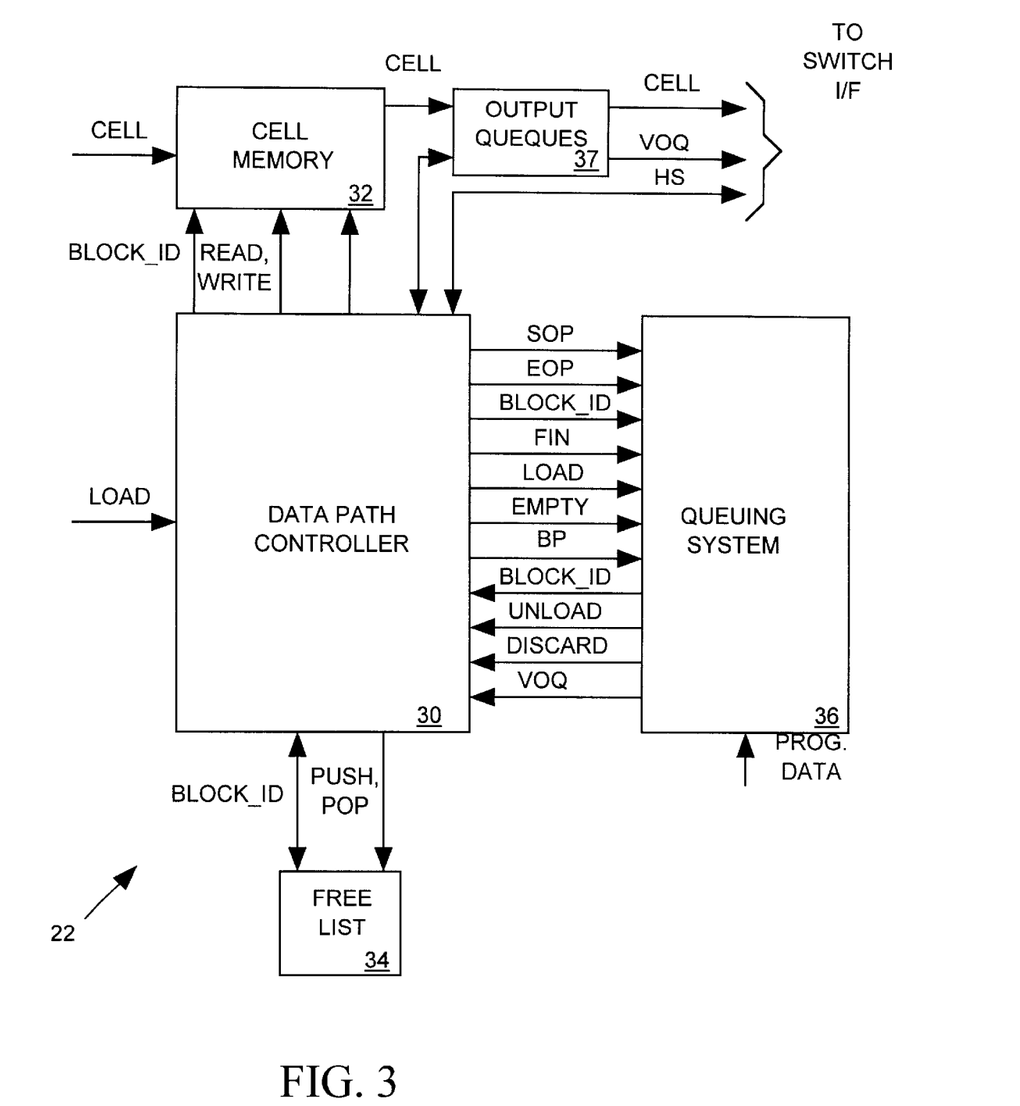
FIG. 3 illustrates a traffic manager of FIG. 2A in more detailed block diagram form.

FIG. 3 illustrates the input switch port's traffic manager 22 of FIG. 2A in more detailed block diagram form. (The output port's traffic manager 26 of FIG. 2B is generally similar in design and operation.) Referring to FIG. 3, traffic manager 22 includes a data path controller circuit 30 for responding to each LOAD signal pulse from protocol processor 20 (FIG. 2A) by writing the cell into a block of storage locations within a cell memory 32. Data path controller 30 maintains in memory a "free list" 34 of addresses of unused cell memory blocks. When a cell arrives from protocol processor 20, data path controller 30 pops an identification number (BLOCK_ID) of an available memory block from free list 34, passes the BLOCK_ID to cell memory 52, and pulses a WRITE signal telling cell memory 32 to store the incoming cell in the memory block identified by BLOCK_ID.

The network system assigns each packet to one of a set of "flows". Each flow has a defined class of service influencing, for example, the maximum and minimum rates and priority with the network switch forwards packets assigned to the flow. The flow to which a packet is assigned also determines which output port 15 (FIG. 1) it to forward the packet outward from network switch port. Each incoming data packet includes a "Flow Identification Number" (FIN) identifying the flow to which it has been assigned. When protocol processor 20 converts an incoming packet into a sequence of one or more cells, it includes the packet's FIN in each cell along with start of packet (SOP) and end of packet (EOP) bits indicating whether the cell is the first and/or last cell of the sequence of cells derived from the packet.

As it stores a cell in cell memory 32, data path controller 30 passes the cell's FIN, SOP bit and EOP bit, along with the BLOCK_ID of cell's storage location to a queuing system 36 and then pulses a LOAD signal to tell the queuing system when a cell has been stored in cell memory 32. Queuing system 36 uses the FIN, BLOCK_ID, SOP and EOP data to keep track of where the cells of each packet are stored in cell memory 32, to keep track of an order in which cells arrived, to keep track of which cells belong to the same packet, to determine an order in which data path controller 30 is to forward cells out of cell memory 32 to switch interface 24 of FIG. 2A, and to determine the VOQ number associated with the switch output port 15 (FIG. 1) that is to forward the packet outward from the network switch. Programming data (PROG DATA) supplied as input to queuing system 36 tells it how to determine forwarding priority, forwarding rates and forwarding output switch ports for all cells based on the cell's FIN.

Queuing system 36 also determines whether each arriving cell includes a valid FIN. If the FIN is not valid, queuing system 36 returns a DISCARD signal in response to the LOAD signal telling data path controller 30 to push the cell's BLOCK_ID back on free list 34, thereby effectively discarding the cell without forwarding it to crosspoint switch 16. Programming data input to queuing system 36 also allocates space in cell memory 32 to classes of cells based on their FINs. When the number of cells of a particular class approaches limits defined by the programming data, queuing system 36 signals data path controller 30 to discard some or all of the arriving cells of that class.

When queuing system 36 wants data path controller 30 to forward a particular cell out of cell memory 32, it sends the cell's BLOCK_ID and the VOQ number associated with the cells forwarding switch output port to the data path controller and then pulses an UNLOAD signal. Data path controller 30 forwards the BLOCK_ID to cell memory 32 and pulses a READ signal, causing cell memory 32 to read the cell into one of a set of output queues 37, each associated with a separate VOQ number. Controller 30 then pushes the cell's BLOCK_ID back onto free list 34 to make the cell memory block available for holding another arriving cell.

When any one of output queues 37 is not empty, controller 30 uses handshaking signals HS to sequentially forward departing cells out of the output queue 37, along with the VOQ number associated with the output queue to switch interface switch 24 of FIG. 2A as fast as the switch interface circuit can accept them. The VOQ number indicates the switch output port that is to forward the cell. When output queues 37 are all empty, controller 30 asserts an EMPTY signal input to queuing system 36 which tells it that it may temporarily increase the rate at which it normally schedules cells for departure. When its internal departure buffer is nearly full controller 30 uses a multibit back pressure signal (BP) to tell queuing system 36 to reduce the rate at which it of schedules cells for departure. When its internal departure buffer is full, controller 30 sets the BP signal to tell queuing system 36 to stop scheduling cells for departure.

Queuing System

Figure 4:
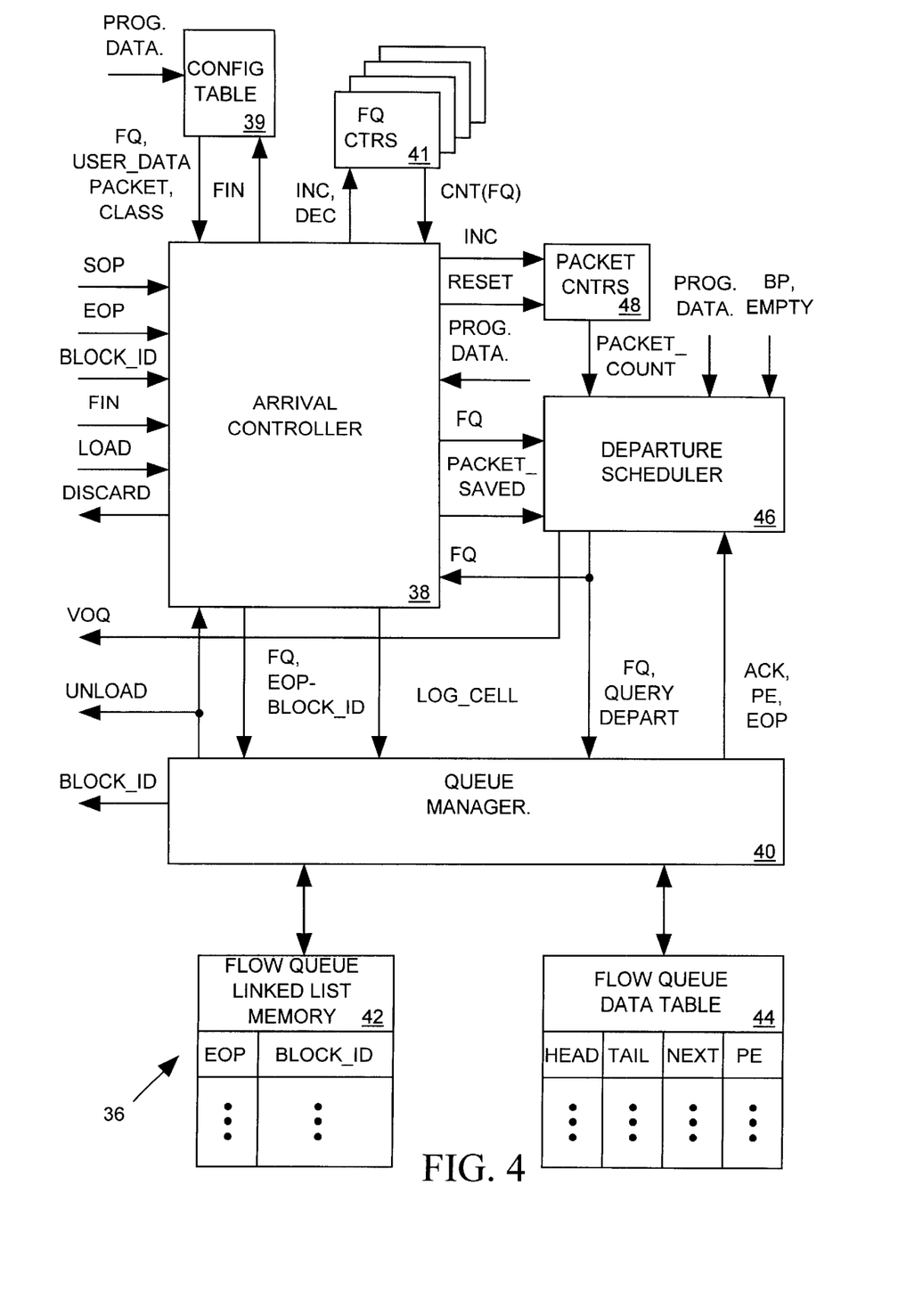
FIG. 4 illustrates the queuing system of FIG. 3 in more detailed block diagram form.

FIG. 4 illustrates queuing system 36 of FIG. 3 in more detailed block diagram form. An arrival controller circuit 38 acquires the SOP, EOP, BLOCK_ID, and FIN data from data path controller 30 of FIG. 3 when the data path controller asserts the LOAD signal to indicate the arrival of a cell at data input terminals of cell memory 32. Arrival controller 38 applies the incoming FIN to a "configuration table" 39, a lookup table programmed by input programming data. Configuration table 39 returns a set of configuration data (FQ, USER_DATA, PACKET, and CLASS) telling queuing system 36 how to handle the cell.

The returned flow queue data FQ identifies the particular "flow queue" to which the incoming cell has been assigned based on its FIN. When configuration table 39 does not return a valid FQ number, arrival controller 38 signals data path controller 30 to discard the cell. As discussed below, the flow queue to which cells are assigned influences the priority and rate with which the traffic manager forwards those cells to the switch interface and also determines which output switch port is to forward the cell outward from the network switch. The traffic manager may maintain many flow queues. Configuration table 39 assigns all cells of the same flow (i.e., all cells having the same FIN) to the same flow queue, though it may assign several flows to the same flow queue. All cells of the same flow queue are forwarded from the cell memory in the order they arrive, but since some flow queues have higher priority than others, cells assigned to different flow queues do not necessarily depart the cell memory in the order they arrive.

Arrival controller 38 keeps track of the number, CNT (FQ), of cells of each flow queue type stored in cell memory 32 of FIG. 3 using a separate counter 41 for each flow queue. Whenever an incoming cell arrives, configuration table 39 returns the cell's assigned FQ number, and arrival controller 38 increments the output CNT(FQ) of the corresponding FQ counter 37. Whenever a cell is forwarded out of cell memory 32, arrival controller 38 decrements the count associated with the departing cell's FQ.

Input programming data to arrival controller 38 allocates a particular maximum amount of the cell memory space to each flow queue. Arrival controller 38 uses counters 37 to keep track of the number of cells of each flow queue stored in cell memory 32 of FIG. 3 because it needs to know when the portion of the cell memory allocated to each flow queue exceeds various levels defined by input programming data. This can happen when incoming packets for a particular flow queue arrive in the cell memory faster than they can be forwarded. When the amount of cell memory space occupied by a particular flow queue reaches any of those levels, arrival controller 38 begins to signal the data path controller 30 of FIG. 3 to randomly discard some of the cells of incoming packets of that flow queue. Generally, as the number of cells of a given flow queue in the cell memory rises to higher levels, arrival controller 38 more frequently discards incoming cells assigned to that flow queue. The CLASS data configuration table 39 returns to arrival controller 38 in response to a cell's FIN data assigns a "discard weight" to the incoming cell. When the number of cells in the cell memory assigned to a particular FQ reaches a defined limit, data path controller 30 begins to discard cells of that FQ; the higher an incoming cell's discard weight, the greater the probability that data path controller 30 will choose to discard that cell. Thus the CLASS data can be used to give cells of the same flow queue differing levels of discard priority based on their FINs.

A USER_DATA bit returned by configuration table 39 indicates whether the cell contains data from a normal system user or contains management data used internally for network control functions. Cells containing management data are very high priority, though normally low in volume, and are never discarded. Cells from system users can be very high volume, but may be discarded when necessary to keep cell memory 32 from getting too full.

When it decides an incoming cell has a valid FQ and is not to be discarded, arrival controller 38 forwards the cell's FQ number, EOP bit and BLOCK_ID to a queue manager 40 and pulses a LOG_CELL signal to tell a queue manager 40 that cell data is available. Queue manager 40, which keeps track of each cell's storage location in cell memory 32 of FIG. 3, responds to the LOG_CELL signal by adding a new entry in a linked list memory 42. Linked list memory 42 has a separate address for each BLOCK_ID in cell memory 32 of FIG. 3. Queue manager 40 maintains a separate linked list in memory 42 for each flow queue, and each entry in a flow queue's linked list is associated with a cell stored in cell memory 32 that has been assigned to that particular FQ number. Each cell's FQ linked list 42 entry is stored at the memory 42 address indicated by the cell's BLOCK_ID and includes the cell's EOP bit and the BLOCK_ID of the next arriving cell, if any, of the same flow queue.

When a cell arrives in cell memory 32, it may not be necessary or desirable for queue manager 40 to keep track of whether an individual cell was part of a group of cells derived from a single incoming packet. Accordingly, where the cells derived from a signal packet are to be treated as separate data transmissions, configuration table 39 normally returns a logically false PACKET data bit to arrival controller 38. This tells arrival controller 38 to automatically set logically true the EOP bit it forwards to queue manager 40 with an incoming cells' FQ and BLOCK_ID number. This makes each cell associated with the same packet look like it came from a separate packet and causes the network switch to forward the cell's data payload as a separate packet. However when the PACKET bit returned by configuration table 39 is true, arrival controller 38 forwards the cell's original EOP bit state to queue manager 40 with the cell's FQ and BLOCK_ID numbers, thereby preserving each cell's identity as a part of a sequence of cells derived from a packet.

Queue manager 40 keeps the BLOCK_ID of the longest-stored and most recently stored cells of each FQ in HEAD and TAIL fields of an entry of a flow queue data table 44 associated with the FQ. The HEAD cell is the next cell to be actually forwarded from the cell memory. Departure scheduler 46 internally queues cells of each flow queue for departure before they are sent out of the cell memory, and signals queue manager when each cell reaches the head of a queue and is ready to be forwarded out of the cell memory. Each entry flow queue data table 44 also includes a NEXT field, the purpose of which is discussed below.

A packet end (PE) bit stored in table 44 indicates whether any currently stored cell of the flow queue has an EOP bit that is set true. When cells of the flow queue are forwarded on a cell-by-cell basis, then all cells of the flow queue will have true EOP bits and the PE bit in the table 44 entry for that flow queue will always be true as long as any cell of the flow queue resides in the cell memory. However, when cells of a flow queue are forwarded on a packet-by-packet basis, then only the last cell of each packet's cell sequence has a true EOP bit. In such case the PE field of the entry in table 44 will only be true if the last cell of at least one packet sequence currently resides in the cell memory. As discussed later, the PE bit field in table 44 indicates cells of the flow queue may be forwarded whether a packet of cells may be forwarded on a cell-by-cell basis or must be forwarded on a packet-by-packet basis. Queue manager 40 updates table 44 whenever a cell arrives or departs the cell memory.

When any cell of a packet arrives with an EOP bit set true, arrival controller 38 transmits the incoming FQ number for that flow queue to a departure scheduler 46 and pulses a PACKET_SAVED signal to indicate that all of the cells of an incoming packet have been saved in the cell memory 32 of FIG. 3. Arrival controller 38 maintains a count (PACKET_COUNT) in one of a set of counters 48 of the number of cells for each arriving packet. Arrival controller 38 increments the count whenever a cell arrives and resets the count whenever it receives an SOP signal from data path controller 30. When departure scheduler 46 receives the PACKET_SAVED signal it acquires the current count (PACKET_COUNT) from one of packet counters 48. The incoming FQ and PACKET_COUNT data tell departure scheduler 46 the flow queue number of the most recently arrived packet and the number of cells that were derived from the packet.

Departure Scheduler

Figure 5:
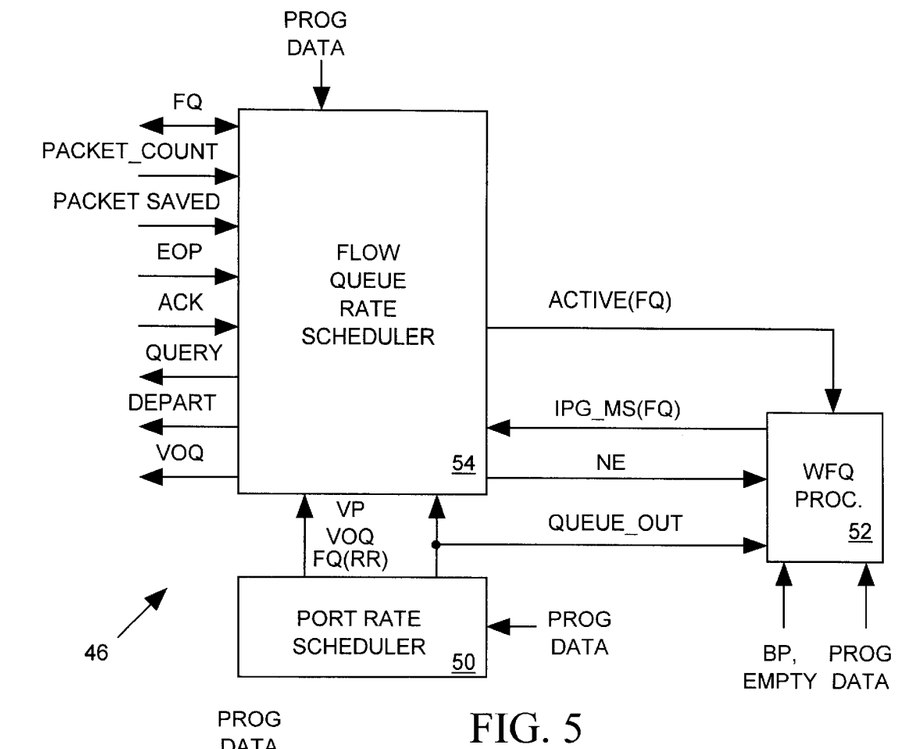
FIG. 5 illustrates the departure scheduler of FIG. 4 in more detailed block diagram form.

FIG. 5 illustrates departure scheduler 46 of FIG. 4 in more detailed block diagram form. Departure scheduler 46 determines when each cell stored in cell memory 32 of FIG. 3 is to be forwarded to switch interface 24 of FIG. 2A and also determines which output switch port is to forward the cell. Departure scheduler 46 keeps track of the number of cells stored in cell memory 32 that are assigned to each flow queue, and when any cells of a particular flow queue are currently stored in cell memory 32, it allocates some of the forwarding bandwidth of traffic manager 22 (FIG. 2A) to that flow queue.

Figure 6:
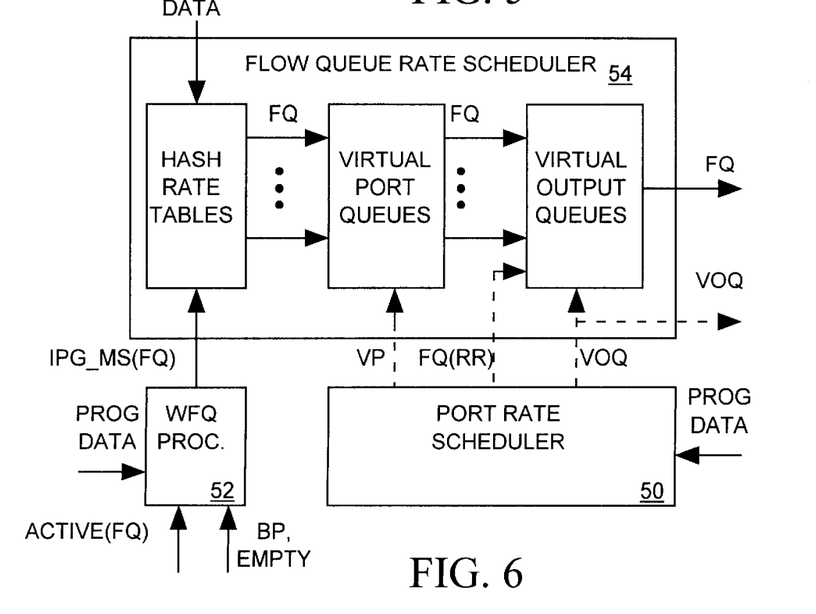
FIG. 6 is a data flow diagram illustrating a manner in which the departure scheduler of FIG. 5 allocates cell forwarding bandwidth.

FIG. 6 illustrates a manner in which departure scheduler 46 determines a rate at which to forward cells assigned to each flow queue (FQ). As mentioned above, all cells having the same FIN are assigned to the same FQ, and more than one FIN may be assigned to the same FQ. Departure scheduler 46 assigns all cells of the same FQ to the same "virtual output queue" (VOQ) so that they are forwarded via crosspoint switch 16 (FIG. 1) to the same one of output switch ports 15. Thus the FQ number to which a packet's FIN is assigned determines the switch output port through which a packet is forwarded.

The flow queue to which a packet's FIN is assigned also influences the rate at which cells forming that packet, and all other packets assigned to the same flow queue, are forwarded to the output switch port 15. As illustrated in FIG. 6, flow queue rate scheduler 54 controls allocation of forwarding bandwidth to the various flow queues. Hash rate tables within flow queue rate scheduler 54 generate the FQ number corresponding to each flow queue at a rate corresponding to the allocated forwarding bandwidth of cells assigned to the corresponding flow queue.

A flow queue is "active" when the cell buffer currently stores at least one cell of that flow queue. Programming data input to flow queue rate scheduler 54 tells it to allocate a specified minimum portion of the switch port's cell forwarding bandwidth to each active flow queue. Thus flow queue rate scheduler 54 generates the FQ number of flow queue at some minimum rate when the flow queue is active. A "weighted fair queuing" (WFQ) processor 52 also allocates among all active flow queues the portion of the switch port's cell forwarding bandwidth in excess of the sum of the minimum bandwidths allocated to all active flow queues. WFQ processor 52 supplies data IPG_MS(FQ) for each flow queue to flow queue rate scheduler 54 telling it how much of the excess bandwidth to allocate to each flow queue. Flow queue rate scheduler 54 increases the rate at which it generates the FQ number of each active flow queue accordingly.

Figure 7:
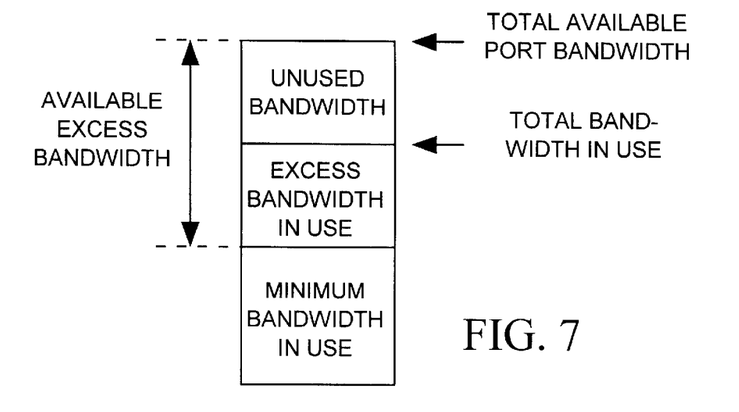
FIG. 7 is a chart illustrating allocation of a switch port's cell forwarding bandwidth among flow queues.

FIG. 7 graphically illustrates how the switch port's available bandwidth is allocated. The sum of minimum bandwidths of all flow queues is the "minimum bandwidth in use" illustrated in FIG. 7. The difference between the port's maximum cell forwarding bandwidth and its minimum bandwidth in use, is the port's "available excess bandwidth" that may be allocated among active flow queues in addition to their assigned minimum bandwidths. Since each flow queue also has a maximum allowable bandwidth, it may not always be possible to allocated all of the switch port's excess bandwidth among the active flow queues. Thus FIG. 7 depicts a portion of the available excess bandwidth that is not currently allocated as "unused bandwidth".

Referring again to FIG. 6, port rate scheduler 50 allocates the switch port's available cell forwarding bandwidth among a set of N "virtual ports", and each flow queue is assigned to a particular one of those virtual ports. More than one flow queue may be assigned to each virtual port. As flow queue rate scheduler 54 generates FQ numbers, each FQ number is shifted into one of a set of virtual port queues (VPQs), each corresponding to a separate one of the virtual ports. The VPQs are first-in, first-out (FIFO) buffers which store and forward the FQ numbers in the order received. Port rate scheduler 50 (FIG. 5) generates an identification number (VP) of each virtual port at rate at which cells of flow queues assigned to that virtual port are to be forwarded. Each generated VP number tells the associated VPQ to forward its longest stored FQ number to one of a set of "virtual output queues" (VOQs), FIFO buffers internal to flow queue rate scheduler 54 of FIG. 5.

Flow queue rate scheduler 54 (FIG. 6) includes a separate VOQ associated with each network switch output port 15 (FIG. 2). Each virtual port is assigned to one of the VOQs, though more than one virtual port may be assigned to the same VOQ. Each network switch input port 14 has a certain bandwidth with which it may forward cells to each network switch output port. Port rate scheduler 50 allocates available bandwidth associated with each network switch output port 15 by controlling the rate at which it generates the VOQ number of the associated virtual output queue. It further allocates the bandwidth among the virtual ports assigned to each virtual output queue by controlling the rate at which it generates the VP numbers of those virtual ports.

Whenever port rate scheduler 50 generates the VP number of a virtual port, thereby causing one of the virtual port queues to forward an FQ number to the virtual output queues, it also generates the VOQ number to which that virtual port has been assigned. The VP number controls whether one of the VOQs shifts in the FQ number. The VP output of port rate scheduler 50 also tells one of the VOQs to generate its longest-stored FQ number as output. As described below, one cell of a given flow queue is forwarded from the cell memory whenever the FQ number of that flow queue is produced by the VOQs. The VOQ number produce by port rate scheduler 50 which cause the VOQs to generate that FQ number indicates which network output switch port 15 (FIG. 1) is to receive the forwarded cell.

Thus port rate scheduler 50 controls the rate at which the network switch input port forwards cells to each network switch output port by generating a VOQ number associated with the network with output port at that rate. Port rate scheduler 50 further allocates the forwarding bandwidth for each virtual output queue among one or more virtual ports by generate the VP number of each virtual port at the forwarding rate allocated to the virtual port. Flow queue rate scheduler 54 further allocates the forwarding rate assigned to each virtual port among a set of flow queues and controls the average rate at which cells of each flow queue are forwarded out of the cell memory by generating the FQ number of that flow queue at the flow queue's allocated forwarding rate.

Port Rate Scheduler

Figure 8:
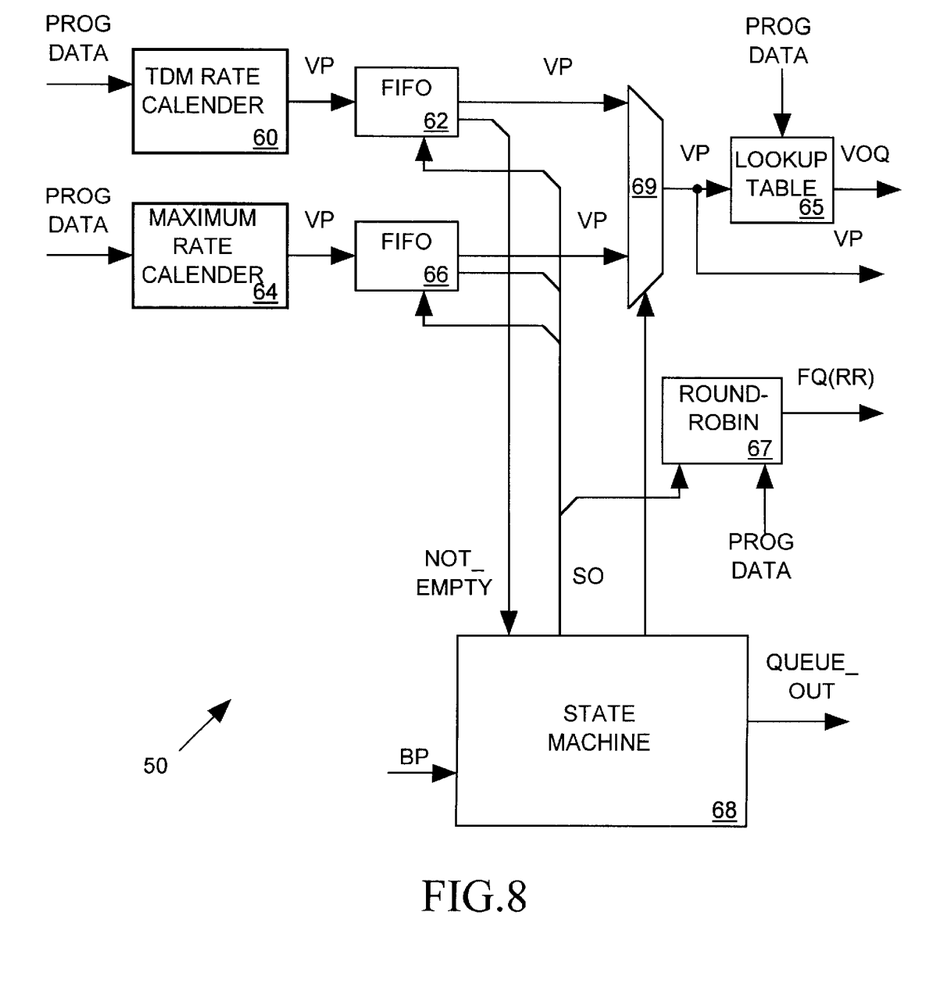
FIG. 8 illustrates the port rate scheduler of FIG. 5 in more detailed block diagram form.

FIG. 8 illustrates port rate scheduler 50 of FIG. 5 in more detailed block diagram form. As discussed above port rate scheduler 50 allocates cell forwarding bandwidth among the various virtual ports and virtual output queues by generating the VP number of each virtual port and the VOQ number of each virtual output queue at the appropriate rates. A virtual port may handle either of two types of traffic: "time domain multiplexing" (TDM) traffic that must be forwarded with relatively constant time intervals between cells at a particular assigned rate, and "maximum rate" traffic that is to be forwarded at some average maximum rate but which may be forwarded with somewhat more variable intervals between cells. Port rate scheduler 50 includes a TDM rate calendar 60 programmed by input programming data which generates the identification number (VP) of each virtual port at the constant rate at which that virtual port is to forward TDM traffic. A maximum rate calendar 64 also programmed by input programming data, generates the ID number (VP) of each port handling maximum rate traffic, the port's assigned maximum rate.

The VP outputs of TDM rate calendar 60 and maximum rate calendar 64 are shifted into FIFO buffers 62 and 66 as they are generated. A state machine 68 monitors FIFO buffers 62 and 66. When either one of those buffers is not empty, state machine 68 signals a multiplexer 69 to send the longest stored VP in that FIFO buffer to a translation table 65 programmed by input programming data. Since timing is more important for TDM traffic, state machine 68 always gives FIFO buffer 62 priority with both FIFO buffers are not empty.

The VP output of multiplexer 65 is sent to port rate scheduler 54 for controlling its internal virtual port queues in a manner described in more detail below. A lookup table 65 programmed by input programming data generates the VOQ number of the virtual output queue to which the virtual port identified by the VP output of multiplexer 69 has been assigned. That VOQ number is also sent to flow queue rate scheduler 54 for use in controlling the virtual output queues in a manner described below.

Whenever multiplexer 69 selects a new virtual port number VP and lookup table 65 generates a new VOQ number, state machine 68 asserts the QUEUE_OUT signal to tell flow queue rate scheduler 54 (FIG. 6) to queue a cell for a flow queue assigned to that VP/VOQ for departure. The QUEUE_OUT signal also clocks a "round-robin" generator 67 programmed by input programming data. Round-Robin generator 67, generates the number FQ(RR) of a flow queue assigned to the virtual port identified by the VP output of multiplexer 69. Round-robin generator 67 generates each flow queue numbers of all flow ques assigned to its input VP in round-robin fashion turn whenever clocked by the QUEUE_OUT signal. The QUEUE_OUT signal pulse to flow queue rate scheduler 50 tells it when the VP, VOQ and FQ(RR) output values are valid.

Flow Queue Rate Scheduler

Figure 9:
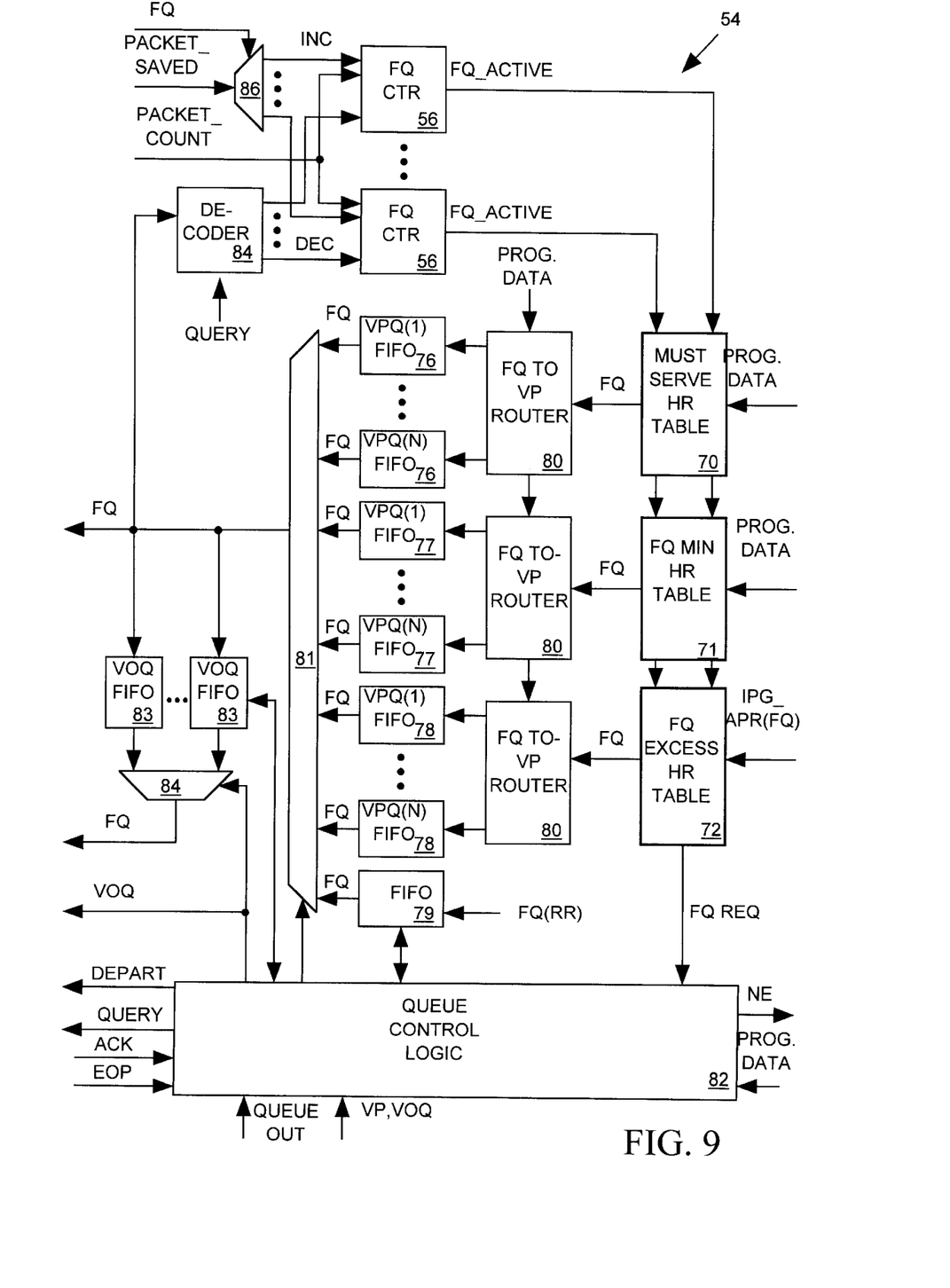
FIG. 9 illustrates the flow queue rate scheduler of FIG. 5 in more detailed block diagram form.

FIG. 9 illustrates flow queue rate scheduler 54 of FIG. 5 in more detailed block diagram form. Flow queue rate scheduler 54 includes a set of hash rate (HR) tables 70–72, each for generating a sequence of FQ numbers. The rate at which each FQ number is generated controls the rate at which cells assigned to that FQ number are forwarded out of cell memory 32 if FIG. 3.

Flow queue counters 56 keep track of the number of cells currently residing in the cell memory for each flow queue. When a flow queue has cells currently residing in the cell memory, a counter 56 associated with that flow queue asserts an FQ_ACTIVE signal input to tables 70–72 to tell them that the flow queue is active. Arrival controller 38 (FIG. 4) uses packet counters 48 to keep track of the number of cells in each arriving packet. When the last cell of a packet arrives, it asserts a PACKET_SAVED signal. A multiplexer 86 controlled by an FQ output of arrival controller 38 routes the PACKET_SAVED signal as an increment signal INC to the appropriate flow queue counter 56 which increments its current count by the value of the PACKET_COUNT data. A decoder 84 decodes the FQ output of multiplexer 81 in response to each pulse of the QUERY signal to supply a DEC signal to one of flow queue counter 56 causing it to decrement its cell count.

Each flow queue counter 56 asserts its FQ_ACTIVE output when its count rises above zero to tell tables 70–72 that a corresponding flow queue is "active" in that cells of that flow queue reside in the cell memory waiting to be forwarded. One or more of tables 70–72 then begins generating FQ numbers for that flow queue at the average rate at which cells of that flow queue are to be forwarded from the cell memory. Each flow queue counter 56 stops asserting its FQ_ACTIVE output when its count rises falls to zero to tell tables 70–72 that no cells of a particular FQ reside in the cell memory and that they should stop generating FQ numbers for that flow queue.

Some high priority, low volume traffic such as network management traffic may be assigned to "must serve" flow queues accorded fixed forwarding bandwidth defined by programming input data. A "must serve" hash rate table 70 generates the FQ number of each currently active must serve flow queue at the rate at which cells of that flow queue must be forwarded. A lower priority flow queue may be allocated a minimum rate at which cells assigned to that flow queue must be forwarded when the flow queue is active. When such a flow queue is active, an FQ minimum HR table 71 produces an output FQ number sequence at for each flow queue at that flow queue's allocated minimum forwarding rate, as defined by input programming data.

Weighted fair queuing processor 52 of FIG. 5 may also allocate a portion of a virtual port's excess bandwidth to each active FQ in addition to the must serve rate or minimum rates allocated by tables 70 and 71. An FQ excess HR table 72 produces the FQ number of every active flow queue at a rate determined by the excess forwarding bandwidth currently allocated to that flow queue by data IPG_APR (FQ) supplied by WFQ processor 52. The rate at which the traffic manager forwards cells of each flow queue therefore matches the rate at which tables 70–72 generate each flow queue's FQ number.

The total forwarding bandwidth of the input switch port is allocated among N virtual ports, and each flow queue is assigned to one of those N virtual ports. Flow queue rate scheduler 54 includes a set of three FIFO buffers 76–78 for each of the N virtual ports. A set of three router circuits 80 route each FQ output of tables 70–72 to the appropriate one of VOQ FIFO buffers 76–78 as indicated by input programming data. High priority FIFO buffers 76 receive FQs from must serve HR table 70, medium priority FIFO buffers 77 receive FQs from FQ minimum HR table 71, and low priority FIFO buffers 78 receive FQs from excess HR table 74. Port rate scheduler 50 (FIG. 8) shifts any generated FQ(RR) number into a lowest priority FIFO buffer 79.

Cells of each flow queue are scheduled for departure from the cell memory either on a cell-by-cell or a packet-by-packet basis by shifting the flow queue's FQ number into one of a set of VOQ FIFO buffers 83. One or more cells are actually sent out of the cell memory ("departed") as each FQ number later reaches the front of one of VOQ FIFO buffers 83.

Whenever port rate scheduler 50 (FIG. 8) generates a VP/VOQ number pair and pulses the QUEUE_OUT signal, it tells queue control logic 82 that one cell or one packet of a flow queue assigned to the virtual port identified by the VP number (of value 1 to N) may be queued for departure, and that one cell of a flow queue assigned to the identified virtual port may be actually departed from the cell memory.

In responding to the QUEUE_OUT signal pulse, queue control logic 82 first sets a multiplexer 81 to select the longest-stored FQ number output of one of buffers 76–79 to provide that FQ number as input to each of VOQ buffers 83, though it does not immediately shift the FQ number into any of buffers 83. Queue controller 82 sets multiplexer 81 to select the highest-priority, non-empty VPQ buffer 76–78 for the virtual port number indicated by the VP data produce port rate scheduler 50. When all buffers 76–78 associated with a particular VP number are empty, queue control logic 82 tells multiplexer 81 to select the current FQ number output of FIFO buffer 79.

A separate VOQ FIFO buffer 83 is provided for each output switch port 15 (FIG. 1). Queue control logic 82 determines whether cells of the flow queue identified by FQ number output of multiplexer 81 are to be queued for departure on a cell-by-cell basis or on a packet-by-packet basis. In the later case, the queue control logic 82 also determines whether the next cell to be queued for departure is the last cell of a packet's cell sequence. To make such determinations, queue control logic 82 QUERY signal input to queue manager 40 of FIG. 4.

As described above, queue manager 40 keeps the BLOCK_ID of the longest-stored cell of each FQ in a HEAD fields of an entry of table 44 associated with the FQ and stores the BLOCK_ID of the next cell to be queued for departure from the cell memory is stored in the NEXT field. The PE bit stored in table 44 is set true when any currently stored cell of the flow queue has a true EOP bit and is otherwise set false. Queue manager 40 responds to the QUERY signal pulse form queue control logic 82 (FIG. 9) by looking up the BLOCK_ID of the NEXT cell in table 44 and then obtaining that cell's EOP bit from linked list 42, returning it along the PE bit from table 44 to queue control logic 82, pulsing an acknowledge signal ACK, and then updating the NEXT field of table 44 to point to a next cell to be queued for departure.

The returned EOP bit will be true if the NEXT cell to be queued for departure is the last cell of a packet sequence or is any cell of a sequence that is to be forwarded on a cell-by cell basis. When that EOP bit is true, queue control logic 82 shifts the FQ number into one of FIFO buffers 83 identified by the VOQ number provided by port rate scheduler 50. If the EOP bit is false, indicating that the cell is to be forwarded on a packet-by-packet basis and is not the last cell of the packet sequence, then queue control logic 82 does not shift the FQ number into any of VOQ FIFO buffers 83.

Once it has decided whether to shift the FQ number into FIFO buffers 83 and has done so, thereby queuing either a cell or a packet for departure, queue control logic 82 determines whether the returned PE bit is true. When PE bit is not true, indicating that cells of the flow queue are to be forwarded on a packet-by-packet basis and that the last cell of a packet resides in the cell memory, control logic 82 does nothing more in response to the QUEUE_OUT signal pulse other than to shift the FQ data out of the particular FIFO buffer 76–79 selected by the VP data.

When the PE bit is true, queue control logic sends a DEPART signal pulse to queue manager 40 to tell it to signal data path controller 30 (FIG. 3) to read the longest-stored (HEAD) cell of that flow queue out of the cell memory and writes it into one of output queues 37 so that it may be forwarded to switch interface 24 of FIG. 2A. The VOQ number associated with that FIFO buffer 83 is forwarded to data path controller 30 to tell it which output queue 37 is to receive the cell. Queue manager 50 also returns to queue control logic 82 the EOP bit from the HEAD cell's entry in linked list 42, and pulses the ACK signal again. Queue manager 50 also updates the HEAD field of table 44 to point to a next longest-stored cell of the flow queue.

When the returned EOP bit is true, queue control logic 82 responds to the second pulse of the ACK signal by shifting the FQ number out of the VOQ FIFO buffer 83 currently selected by multiplexer 84. When the returned EOP bit is false, indicating that the departed cell is not the last cell of a sequence being forwarded on a packet-by-packet basis, queue control logic refrains from shifting the FQ bit out of that VOQ FIFO buffer 83. In either case queue control logic 82 shifts the FQ data out of the currently selected FIFO buffer 76–79.

Weighted Fair Queuing Processor

Figure 10:
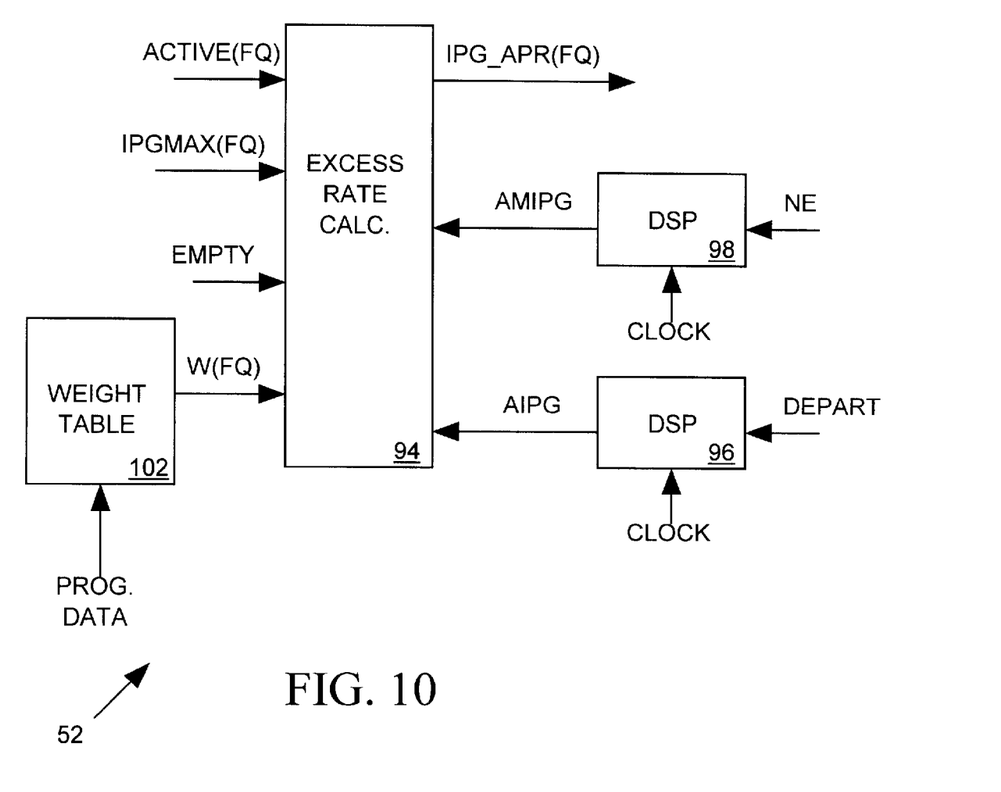
FIG. 10 illustrates the weighted fair queuing processor of FIG. 5 in more detailed block diagram form.

FIG. 10 illustrates WFQ processor 52 of FIG. 5 in more detailed block diagram form. WFQ processor 52 supplies the flow rate control data inputs to flow queue excess hash rate table 72 of flow queue rate scheduler 54 of FIG. 9 for controlling the rate at which table 54 generates FQ numbers for each flow. The rate at which table 54 generates the FQ number of each flow queue determine the excess bandwidth allocated to that flow queue.

A flow queue is active when cells assigned to that flow queue reside in cell memory 32 of FIG. 2A. The ACTIVE (FQ) outputs of counters 56 of FIG. 5, indicating which flow queues are currently active, provide input to an excess rate calculator 94, which generates the IPG_APR(FQ) control data input to FQ excess HR table 72 of FIG. 9. That data controls the rate at which table 74 generates each FQ number. Excess rate calculator 90 determines the magnitude of the IPG_APR(FQ) data for each value of FQ based on several factors. Once such factor, "average interpacket gap" (AIPG) is generated by a digital signal processing (DSP) circuit 96 which computes an average period between QUEUE_OUT signals generated by port rate scheduler 50 of FIG. 5 over several CLOCK signal cycles. The QUEUE_OUT signal frequency is a measure of the input port's total available bandwidth. The QUEUE_OUT signal frequency is normally fixed by programming data bus is occasionally reduced when switch interface circuit 24 (FIG. 2) asserts the back pressure input signal BP to state machine 68.

A similar DSP circuit 98 supplies excess rate calculator 94 with an "average minimum interpacket gap" data value (AMIPG) indicating a time-averaged delay between FQ numbers generated by must serve table 70 and minimum HR table 72 of FIG. 9. Queue control logic circuit 82 of FIG. 9 generates a "not-excess" signal pulse NE in response to each QUEUE_OUT signal pulse whenever it is currently signaling multiplexer 83 to select the output of one of FIFO buffers 76 or 77. Thus the average period between NE signal pulses (the value of the AMIPG data output of DSP circuit 98) is a measure of the average period between must serve and minimum rate cells departing cell memory 32 of FIG. 3.

Input program data programs a weight table 102 supplying excess rate calculator 94 with separate weight data W(FQ) for each flow queue. When the ACTIVE(FQ) data indicates that a flow queue is inactive, excess rate calculator 94 does not allocate any excess bandwidth to that flow queue. However when a flow queue is active, rate calculator 94 allocates an amount of excess forwarding bandwidth to flow queue based in part on its weight relative to the weight of other active flow queues, as described in more detail below.

Each flow queue may be allocated only a predetermined maximum excess forwarding bandwidth indicated by programming data IPGMAX(FQ) supplied as input to excess rate calculator 94. The IPGMAX(FQ) data expresses each flow queue's maximum allowable excess bandwidth in terms of an allowable value of the IPG_APR(FQ) output data of excess rate calculator 94. The larger the value of IPGMAX(FQ) for a particular flow queue, the larger the minimum allowable delay between FQ numbers generated by excess HR table 72 of FIG. 9, and the smaller the allowable amount of excess bandwidth that may be allocated to the flow queue.

Excess rate calculator 94 calculates the value of its output IPG_APR(FQ) data for each active flow queue in accordance with the following expression:

$$IPG\_APR(FQ) = \max\left(\frac{(W_T/W(FQ)(1/OSF)}{(1/AIPG)-(1/AMIPG)} IPGMAX(FQ)\right) \quad [1]$$

In the above expression, the $W_T$ parameter is the current sum of weight values W(FQ) for all flow queues and the OSF parameter is an "overshoot factor" described below. The OSF parameter usually has a value of 1, though it can be temporarily increased.

The AIPG and AMIPG parameters are the outputs of DSP circuits 96 and 98 of FIG. 10. Expression [1] above uses the AIPG value as a measure of total available port bandwidth and uses the AMIPG value as a measure of the portion of the port's bandwidth currently satisfying the must serve and minimum bandwidth requirements of all flow queues. Thus the value (1/AIPG)–(1/AMIPG) is a measure of the total available excess port bandwidth that may be allocated among the currently active flow queues. Expression [1] employs a moving average, measured total and minimum interpacket gap values AIPG and AMIPG (rather than instantaneous measured IPG values) in order to dampen the excess rate calculator's feedback response to changes in flow queue active status, thereby damping rapid swings in flow rates that would otherwise result from traffic bursts.

The factor $W_T/W(FQ)$ in expression [1] ensures that the amount of excess bandwidth an active flow queue is allocated in proportion to a ratio of that flow queue's weight to the sum of weights of all active flow queues. Thus by adjusting the weight data values produced by weight table 102, and by adjusting the IPGMAX(FQ) data input to excess rate calculator circuit 94, we can influence how the traffic manager allocates excess bandwidth among active flows. Normally flows with higher maximum bandwidths (lower IPGMAX(FQ) values) should be accorded greater weights.

When data path controller 30 of FIG. 3 senses that all output queues 37 are empty, it sends an EMPTY signal to excess rate calculator 94 within traffic manager 22. The overshoot factor OSF in equation [1] is normally set to 1, but on receiving the EMPTY signal, excess rate calculator 94 temporarily sets overshoot factor OSF to a high value. This can temporarily increase the bandwidth initially allocated to flows that thereafter become active, thereby "overshooting" the actual bandwidth of the port. When data path controller 30 subsequently loads cells into its internal cell buffer, it turns off the EMPTY signal, thereby causing excess rate calculator 94 to reset the overshoot factor OSF to unity.

On system startup, when no flow queues are active, excess rate calculator 94 nulls the interpacket gap value IP_APR (FQ) for all values of FQ. This tells HR tables 72 of FIG. 9 to refrain from producing any output FQ numbers. Hence no flow queue receives any portion of the port's excess forwarding bandwidth. Thereafter when cells of a particular flow queue (for example FQ=1) are stored in the cell memory, and that flow queue has been assigned a minimum and maximum flow rate, the ACTIVE(1) data for that flow queue causes excess rate calculator 94 to set its output IPG_APR(FQ) to a non-zero value and expression [1] for flow queue 1 reduces to IPGMAX(1), the minimum allowable excess interpacket gap (producing maximum allowable bandwidth) for flow queue 1. Thus excess rate calculator 94 allocates flow queue 1 all of the flow queue's maximum allowable excess bandwidth.

When a second flow queue, for example flow queue 2, also becomes active, IPG_MIN(2) takes on a non-zero value. As it re-evaluates expression [1] for each flow, excess rate calculator 94 re-allocates the port's excess bandwidth between the two active flow queues in accordance with their relative weights W(1) and W(2). Flow queue 1 receives the proportion W(1)/[W(1)+W(2)] of the excess bandwidth and flow queue 2 receives the proportion W(2)/[W(1)+W(2)] of the excess bandwidth, though neither flow queue may be allocated more bandwidth than is allowable by its corresponding IPGMAX(FQ) data input to excess rate calculator 94. As more flow queues become active, or as active flow queues become inactive, excess rate calculator 94 continues to re-allocate the port's excess bandwidth among all active flow queues in accordance with expression [1].

Thus has been shown and described a forwarding bandwidth allocation system for a network switch port which allocates the port's forwarding bandwidth only to active flow queues according to predetermined forwarding weights assigned to each flow queue.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

We claim:

1. A method implemented by a network switch port for receiving, storing and forwarding cells of network data transmissions, each cell being assigned to one of plurality of flow queues, wherein the switch port has a forwarding bandwidth with which it may forward cells, the method comprising the steps of:
   a. separately assigning a forwarding weight to each flow queue of the plurality of flow queues;
   b. receiving and storing the cells assigned to ones of the flow queues in a cell memory,
   c. allocating a portion of the switch port's forwarding bandwidth to each flow queue, wherein each flow queue's allocated portion is a function of its assigned forwarding weight; and
   d. forwarding cells assigned to each flow queue from the cell memory at a rate set in accordance with that flow queue's allocated portion of the switch port's forwarding bandwidth.

2. The method in accordance with claim 1 wherein each flow queue is allocated a portion of the switch port's forwarding bandwidth only when at least one cell assigned to that flow queue resides in the cell memory.

3. The method in accordance with claim 1 wherein step c is repeated each time a cell is stored in the cell memory at step b.

4. The method in accordance with claim 1 wherein step c is repeated each time a cell is stored in the cell memory at step b and each time a cell is forwarded from the cell memory at step d.

5. The method in accordance with claim 1 wherein each flow queue's allocated portion of the switch port's allowable bandwidth is a function of that flow queue's assigned forwarding weight relative to a sum of assigned forwarding rates of all flow queues having cells stored in the cell memory.

6. The method in accordance with claim 1
   wherein each flow queue has associate therewith an assigned minimum forwarding bandwidth and an assigned maximum forwarding bandwidth, and
   wherein the portion of the port's forwarding bandwidth allocated to each flow queue having at least one cell stored in the cell memory comprises a lesser of the flow queue's assigned maximum forwarding bandwidth and a sum of:
      the flow queue's assigned minimum forwarding bandwidth, and
      a fraction of the switch port's forwarding bandwidth determined in accordance with a ratio of the flow queue's assigned forwarding weight to a sum of assigned forwarding weights of all flow queues having at least one cell stored in the cell memory.

7. The method in accordance with claim 6 wherein step c is repeated each time a cell is stored in the cell memory at step b and each time a cell is forwarded from the cell memory at step d.

8. A traffic manager for a network switch port for receiving, storing and forwarding cells of network data transmissions, each cell being assigned to one of plurality of flow queues, wherein the switch port has an forwarding bandwidth with which it may forward cells, the traffic manager comprising:
   a cell memory;
   first means for separately assigning a forwarding weight to each flow queue of the plurality of flow queues; and
   second means for receiving and storing the cells assigned to ones of the flow queues in the cell memory, for allocating a portion of the switch port's forwarding bandwidth to each flow queue, and for forwarding cells assigned to each flow queue from the cell memory at a rate computed in accordance with that flow queue's allocated portion of the switch port's allowable bandwidth, wherein the second means computes each flow queue's allocated portion of the switch port's forwarding bandwidth as a function of its assigned forwarding weight.

9. The traffic manager in accordance with claim 8 wherein the second means computes every flow queue's allocated portion of the switch port's forwarding bandwidth each time its stores a cell in the cell memory.

10. The traffic manager in accordance with claim 8 wherein the second means computes every flow queue's allocated portion of the switch port's forwarding bandwidth each time its forwards a cell from the cell memory.

11. The traffic manager in accordance with claim 8 wherein the second means computes every flow queue's allocated portion of the switch port's forwarding bandwidth each time its stores a cell in the cell memory and each time it forwards a cell from the cell memory.

12. The traffic manager in accordance with claim 8 wherein the second means computes each flow queue's allocated portion of the switch port's allowable bandwidth as a function of that flow queue's assigned forwarding weight relative to a sum of assigned forwarding rates of all flow queues having cells stored in the cell memory.

13. The traffic manager in accordance with claim 8
   wherein each flow queue has associated therewith an assigned minimum forwarding bandwidth and an assigned maximum forwarding bandwidth, and
   wherein the second means computes an excess bandwidth of the switch port in excess of a portion of its forwarding bandwidth needed to forward cells of flow queues having at least one cell stored in the cell memory with their assigned minimum forwarding bandwidths;
   wherein the second means computes the portion of the port's forwarding bandwidth allocated to each flow queue having at least one cell stored in the cell memory as a lesser of the flow queue's assigned maximum forwarding bandwidth and a sum of:
- the flow queue's assigned minimum forwarding bandwidth, and
- a fraction of the switch port's excess bandwidth, the fraction being determined in accordance with a ratio of the flow queue's assigned forwarding weight to a sum of assigned forwarding weights of all flow queues having at least one cell stored in the cell memory.

14. The traffic manager in accordance with claim 13 wherein the second means computes every flow queue's allocated portion of the switch port's forwarding bandwidth each time it stores a cell in the cell memory and each time it forwards a cell from the cell memory.

15. The traffic manager in accordance with claim 13 wherein the second means comprises:
- a first hash rate table for generating a flow queue (FQ) number referencing each flow queue for which at least one cell is stored in the cell memory at a first rate determined in accordance with the flow queue's assigned minimum forwarding bandwidth,
- a second hash table for generating the flow queue (FQ) number referencing each flow queue for which at least one cell is stored in the cell memory at a second rate determined in accordance with a difference between the flow queue's allocated portion of the switch port's forwarding bandwidth and the flow queue's assigned minimum bandwidth, and
- means for forwarding cells of each flow queue from the cell memory at a third rate influenced by the first and second rates at which the first and second hash rate tables generate FQ numbers referencing that flow queue.

16. The traffic manager in accordance with claim 13 wherein the second means further comprises a weighted fair queuing processor for controlling the rate at which the second hash rate table generates each FQ number,
wherein the weighted fair queuing processor computes the switch port's excess bandwidth as a function of a rate at which cells are currently forwarded from the cell memory, and a rate at which the first hash rate table generates FQ numbers and computes the portion of the port's forwarding bandwidth allocated to each flow queue having at least one cell stored in the cell memory.

17. A traffic manager for a network switch port, for storing and later forwarding incoming cells, wherein each incoming cell is assigned to one of a plurality of flow queues, wherein each flow queue has an assigned minimum forwarding bandwidth with which cells of that flow queue must be forwarded, wherein each flow queue also has an assigned maximum bandwidth with which cells of that flow queue may be forwarded, the traffic manager comprising:
- a cell memory, and
- a data path controller for storing incoming cells in the cell memory and for later forwarding each cell out of the cell memory at rate determined by input control signals, and
- a queuing system for supplying the input control signals to the data path controller,
- wherein when any flow queue is active in that it has cells currently stored in the cell memory the queuing system allocates each active flow queue its assigned minimum bandwidth,
- wherein the queuing system assigns each flow queue a forwarding weight,
- wherein the queuing system dynamically allocated allocates each active flow queue an additional forwarding bandwidth in relative proportion to its assigned forwarding weight such that each active flow queue has a total allocated forwarding bandwidth that is a sum of its assigned minimum forwarding bandwidth and its allocated additional forwarding bandwidth, and
- wherein the queuing system signals the data path controller to forward cells of each active flow queue from the cell memory at a rate determined in accordance with the flow queue's total allocated bandwidth.

18. The traffic manager in accordance with claim 17 wherein the queuing system limits the additional forwarding bandwidth it allocates to each active flow queue such that the flow queue's total allocated forwarding bandwidth does not exceed that flow queue's assigned maximum forwarding bandwidth.

\* \* \* \* \*